(12) United States Patent
Lowenberg

(10) Patent No.: US 12,486,003 B2
(45) Date of Patent: Dec. 2, 2025

(54) MECHANICAL ATTACHMENT MECHANISM WITH CATCHMENT FINGERS ENGAGING CURVED GROOVES

(71) Applicant: The United States of America, as represented by the Secretary of the Navy, San Diego, CA (US)

(72) Inventor: Lance V. Lowenberg, San Diego, CA (US)

(73) Assignee: United States of America represented by the Secretary of the Navy, Washington, DC (US)

( * ) Notice: Subject to any disclaimer, the term of this patent is extended or adjusted under 35 U.S.C. 154(b) by 579 days.

(21) Appl. No.: 17/731,633

(22) Filed: Apr. 28, 2022

(65) Prior Publication Data

US 2023/0348023 A1 Nov. 2, 2023

(51) Int. Cl.
*B63B 21/60* (2006.01)
*B63B 21/00* (2006.01)
(Continued)

(52) U.S. Cl.
CPC .............. *B63B 21/60* (2013.01); *B63G 8/001* (2013.01); *B63B 2021/004* (2013.01);
(Continued)

(58) Field of Classification Search
CPC ... B63B 21/00; B63B 2021/004; B63B 21/08; B63B 21/58; B63B 21/60; B63G 8/001; B63G 2008/002; B63G 2008/008; B63G 8/42; B63G 2008/425; B64G 1/64; B64G 1/641; B64G 1/642; B64G 1/646; B64G 1/6462; B64G 1/6464; F16B 2/06;
(Continued)

(56) References Cited

U.S. PATENT DOCUMENTS 4,195,804 A * 4/1980 Hujsak ................. B64G 1/6464
244/172.4
4,976,399 A * 12/1990 Bay ........................ B64G 1/641
244/172.4
(Continued)

FOREIGN PATENT DOCUMENTS

CN 112319869 A * 2/2021 ............ B64G 1/646

*Primary Examiner* — Ajay Vasudeva
(74) *Attorney, Agent, or Firm* — Naval Information Warfare Center Pacific; Kyle Eppele; James R. McGee

(57) ABSTRACT

A mechanical attachment mechanism includes a clamp and a receptacle. The clamp includes a trigger arm and catchment fingers biased to pivot toward the trigger arm. The receptacle includes an aligner and curved grooves. The curved grooves each have open exterior and closed interior ends. The trigger arm of the clamp is biased from a triggered position toward secured and extended positions. The extended position is for the trigger arm beginning and ending contact between the trigger arm and the aligner. The extended position is also for the trigger arm capturing the catchment fingers of the clamp from the open exterior end of the curved grooves of the receptacle. The triggered position is for the trigger arm releasing the catchment fingers into the curved grooves. The secured position is for securing the clamp and the receptacle together with the catchment fingers engaging the closed interior end of the curved grooves.

20 Claims, 8 Drawing Sheets

(51) Int. Cl.
*B63G 8/00* (2006.01)
*B63G 8/42* (2006.01)

(52) U.S. Cl.
CPC .. *B63G 2008/002* (2013.01); *B63G 2008/008* (2013.01); *B63G 2008/425* (2013.01)

(58) Field of Classification Search
CPC ........ F16B 2/10; F16B 21/06; F16B 2200/10; F16B 2200/20; F16B 2200/40
USPC ............ 114/249, 250, 252; 244/172.4, 172.5
See application file for complete search history.

(56) References Cited

U.S. PATENT DOCUMENTS

| | | | | |
|---|---|---|---|---|
| 5,845,377 | A * | 12/1998 | Bibeault | E05C 3/34 24/608 |
| 7,857,261 | B2 * | 12/2010 | Tchoryk, Jr. | B64G 1/6464 280/514 |
| 7,861,974 | B2 * | 1/2011 | Hays | B64G 1/6464 244/172.4 |
| 8,991,447 | B1 * | 3/2015 | Petersen | B67D 9/00 141/94 |
| 12,195,204 | B2 * | 1/2025 | Deuitch | B64G 1/402 |

* cited by examiner

MECHANICAL ATTACHMENT MECHANISM WITH CATCHMENT FINGERS ENGAGING CURVED GROOVES

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil. Reference Navy Case Number 108138.

BACKGROUND OF THE INVENTION

There is a general need for attachments. For example, an unmanned underwater vehicle (UUV) often needs to connect to another UUV, stations on the seafloor, or tethered underwater nodes for transferring power, data, materials, etc. Typical methods of attachment and detachment use of electric or hydraulic actuators to secure objects together and then release them when necessary. However, electric or hydraulic actuators are expensive, require operating power, have many complex moving parts, and have multiple failure points. Especially in the underwater environment, any power connections or rotating or sliding components are a weak points where water can enter and damage vital components.

SUMMARY

A mechanical attachment mechanism includes a clamp and a receptacle. The clamp includes a trigger arm extensible along an axis and catchment fingers arranged around the axis and biased to pivot toward the trigger arm. The receptacle includes an aligner and curved grooves. The curved grooves each have a closed interior end and an open exterior end. During attachment between the clamp and the receptacle, the trigger arm of the clamp starts in an extended position before beginning a contact between the clamp and the receptacle. After beginning the contact, the trigger arm and the aligner of the receptacle move toward each other while aligning the axis of the clamp with a corresponding axis of the receptacle and while the trigger arm, in the contact with the aligner, transitions from the extended position to a triggered position. Upon the trigger arm reaching the triggered position, the trigger arm releases the catchment fingers of the clamp into the curved grooves of the receptacle, and the clamp and the receptacle become secured to each together with the catchment fingers engaging the closed interior end of the curved grooves. During detachment between the clamp and the receptacle, as the clamp and the receptacle relatively move, including rotating relative to each other around the axis while the catchment fingers engage the curved grooves from the closed interior end to the open exterior end of the curved grooves, the trigger arm, in the contact with the aligner, transitions to the extended position. Upon the trigger arm reaching the extended position, the trigger arm captures the catchment fingers from the open exterior end of the curved grooves. Thus, the trigger arm returns to the extended position after ending the contact between the clamp and the receptacle.

A mechanical attachment mechanism includes a clamp and a receptacle. The clamp includes a trigger arm extensible along an axis and catchment fingers arranged around the axis and biased to pivot toward the trigger arm. The receptacle includes an aligner and curved grooves, which each have an open exterior end and a closed interior end. The trigger arm of the clamp includes a spring that biases the trigger arm along the axis from a triggered position toward a secured position and an extended position. The extended position is for the trigger arm beginning and ending contact between the trigger arm and the aligner of the receptacle. The extended position is also for the trigger arm capturing the catchment fingers of the clamp from the open exterior end of the curved grooves of the receptacle. The triggered position is for the trigger arm releasing the catchment fingers into the curved grooves. The secured position is for securing the clamp and the receptacle together with the catchment fingers engaging the closed interior end of the curved grooves.

A method for attachment and detachment uses a mechanical attachment mechanism including a clamp and a receptacle. A contact begins between a trigger arm of the clamp and an aligner of the receptacle with the trigger arm at an extended position, the trigger arm extensible along an axis of the clamp. The trigger arm and the aligner align along the axis while the clamp and the receptacle move toward each other along the axis and while the trigger arm, in the contact with the aligner, correspondingly transitions from the extended position to a triggered position. When the trigger arm reaches the triggered position, the trigger arm releases catchment fingers of the clamp into curved grooves of the receptacle nearby a closed interior end of the curved grooves. The clamp and the receptacle are secured together with the catchment fingers engaging the closed interior end of the curved grooves with the trigger arm at a secured position. The clamp and the receptacle rotate relative to each other around the axis while the catchment fingers engage the curved grooves from the closed interior end to an open exterior end of the curved grooves and while the trigger arm, in the contact with the aligner, correspondingly transitions from the triggered position to the extended position. The trigger arm captures the catchment fingers from the open exterior end of the curved grooves when the catchment fingers exit the open exterior end of the curved grooves and when the trigger arm reaches the extended position. The contact ends between the trigger arm of the clamp and the aligner of the receptacle with the trigger arm at the extended position.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed mechanisms and methods below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Embodiment of the invention provide an attachment mechanism that is purely mechanical, and hence reduces the cost, complexity, and vulnerability for attaching and releasing objects from one another. This mechanical attachment mechanism enables repeatedly connecting and separating objects without any added electrical or hydraulic components. This mechanical attachment mechanism is also extremely depth tolerant, as all components are solid, so there are no pressure vessels for motors and other actuators. This mechanical attachment mechanism is therefore fully functional and operational under any fluid pressure.

Figure 1A:
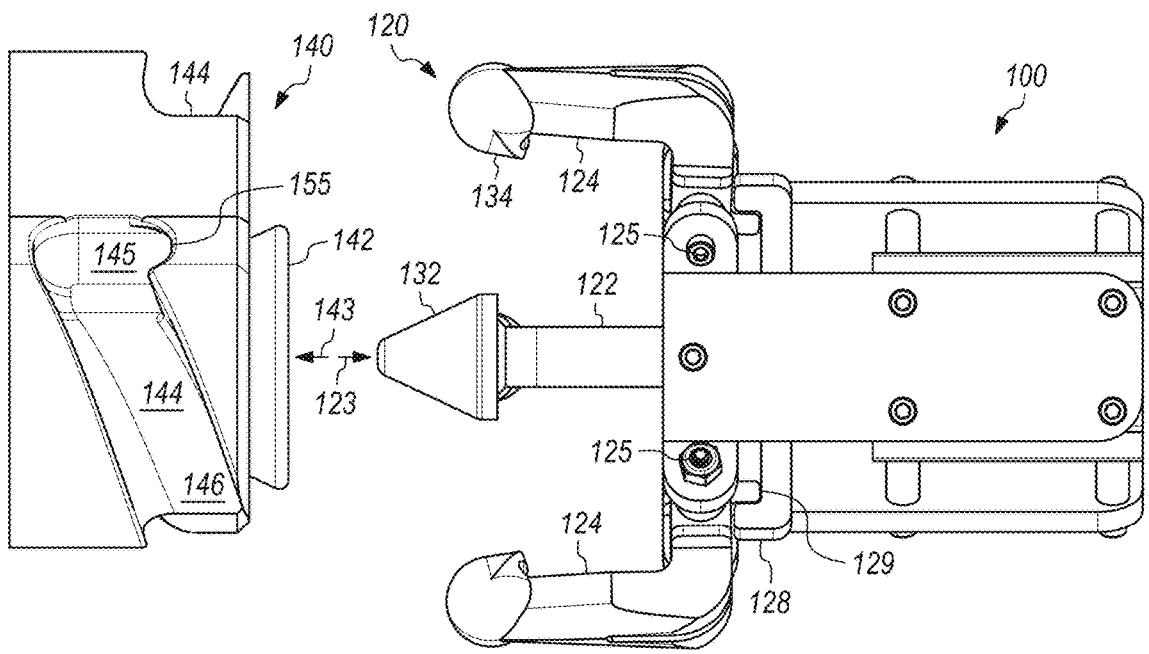
FIG. 1A is a side view and FIG. 1B is a perspective view of a prototype of a mechanical attachment mechanism before a beginning of a contact between a clamp and a receptacle of the mechanical attachment mechanism in accordance with an embodiment of the invention.
Figure 1B:
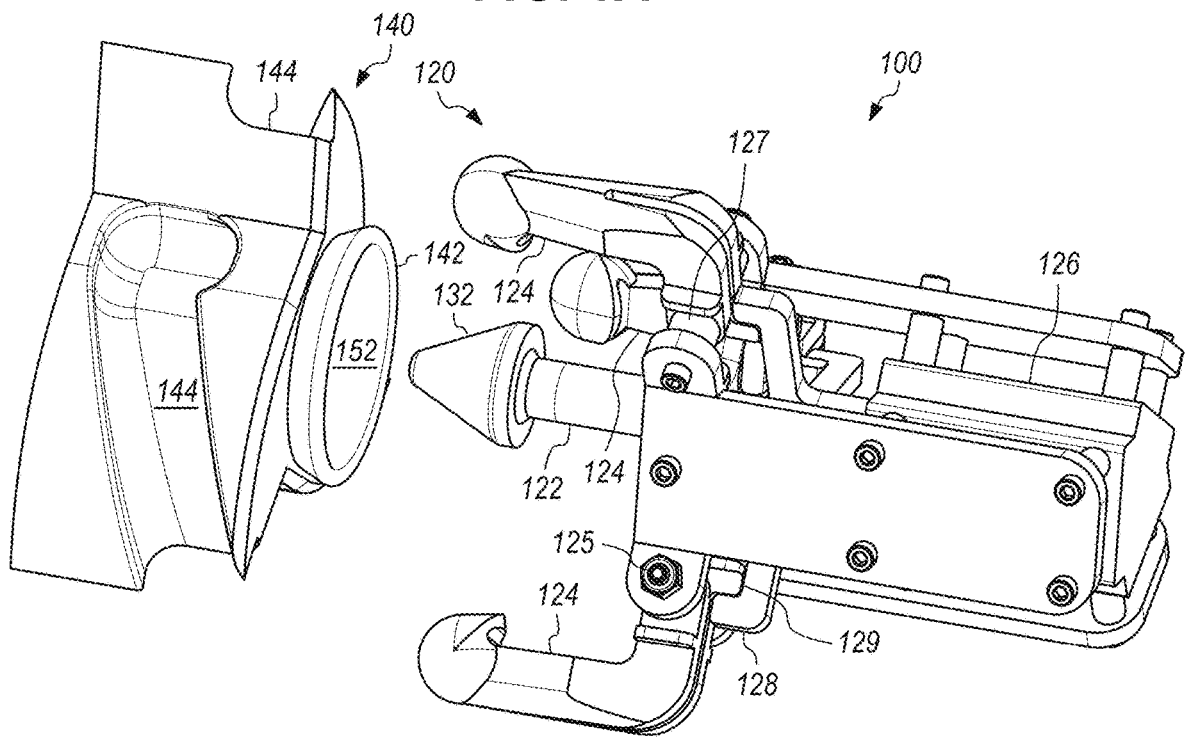

FIG. 1A is a side view and FIG. 1B is a perspective view of a prototype of a mechanical attachment mechanism 100 before a beginning of a contact between a clamp 120 and a receptacle 140 of the mechanical attachment mechanism 100 in accordance with an embodiment of the invention. FIGS. 2A-B, 3A-B, 4A-B, 5A-B, and 6A-B are similar views during progressive stages of attachment and detachment of the clamp 120 and the receptacle 140 of FIG. 1A-B.

The mechanical attachment mechanism 100 includes a clamp 120 and a receptacle 140. The clamp 120 includes a trigger arm 122 extensible along an axis 123 and biased toward an extended position as shown in FIG. 1A-B. The clamp 120 also includes catchment fingers 124 arranged around the axis 123 and biased to pivot toward the trigger arm 122 around pivots 125. The receptacle 140 includes an aligner 142 and curved grooves 144. The curved grooves 144 each have a closed interior end 145 and an open exterior end 146.

In one embodiment, the catchment fingers 124 of the clamp 120 are three identical catchment fingers 124 arranged evenly spaced around the axis 123, and the curved grooves 144 of the receptacle 140 are three identical curved grooves 144 arranged evenly spaced around the receptacle 140 as shown in FIG. 1B. Other embodiments include two catchment fingers 124 or four or more catchment fingers 124.

In one embodiment, the trigger arm 122 of the clamp 120 includes a spring 126 that biases the trigger arm 122 along the axis 123 from a triggered position toward a secured position and an extended position, which extended position is shown in FIG. 1A-B. In addition, each of the catchment fingers 124 includes a torsional spring 127 that biases the catchment finger to pivot toward the trigger arm 122 around pivots 125. It will be appreciated that the biasing of the trigger arm 122 and the catchment fingers 124 is not limited to biasing with springs 126 and 127.

Figure 2A:
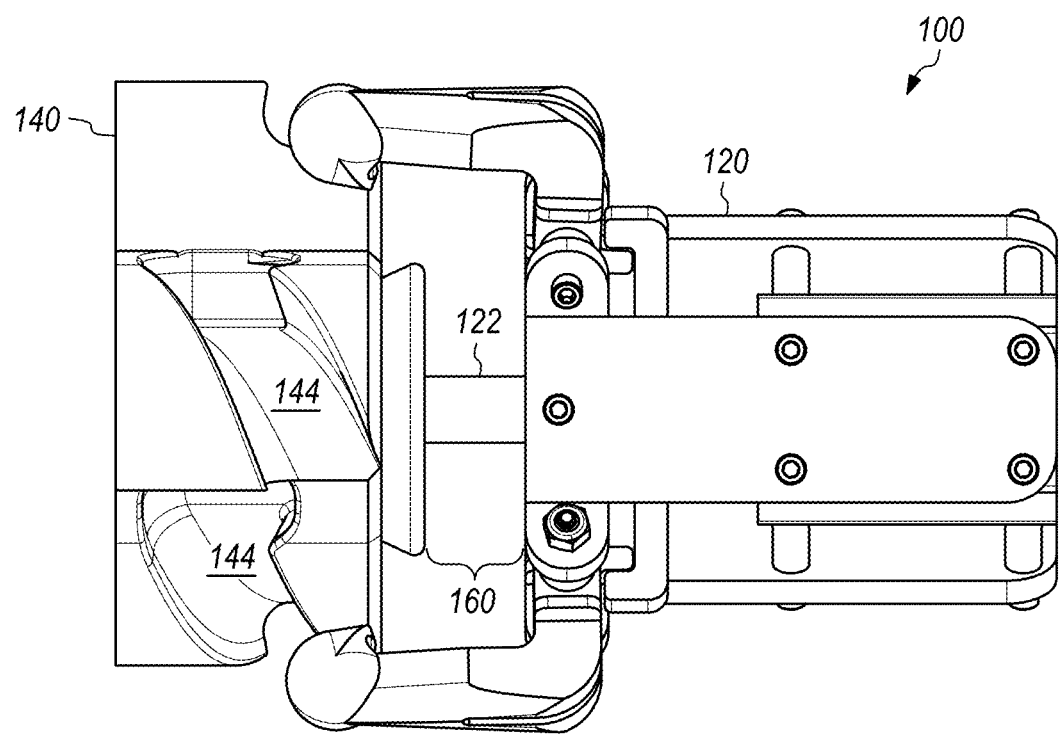
FIG. 2A is a side view and FIG. 2B is a perspective view of a prototype of a mechanical attachment mechanism at a beginning of a contact between a clamp and a receptacle of the mechanical attachment mechanism in accordance with an embodiment of the invention.
Figure 2B:
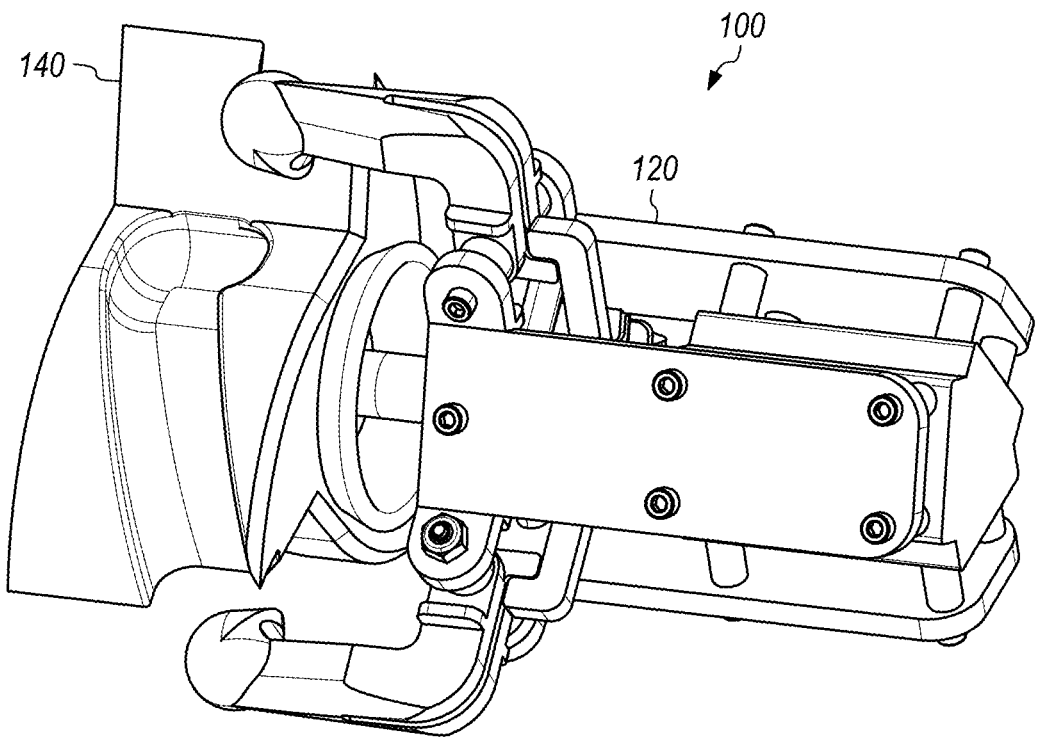
Figure 3A:
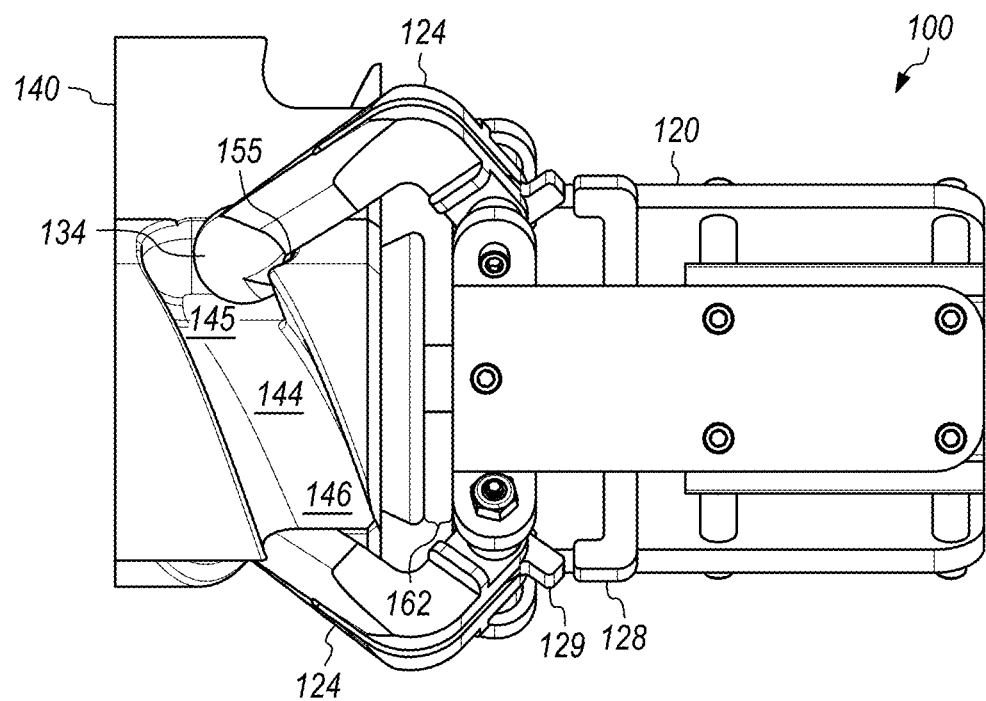
FIG. 3A is a side view and FIG. 3B is a perspective view of a prototype of a mechanical attachment mechanism upon a clamp and a receptacle of the mechanical attachment mechanism becoming secured to each together in accordance with an embodiment of the invention.
Figure 3B:
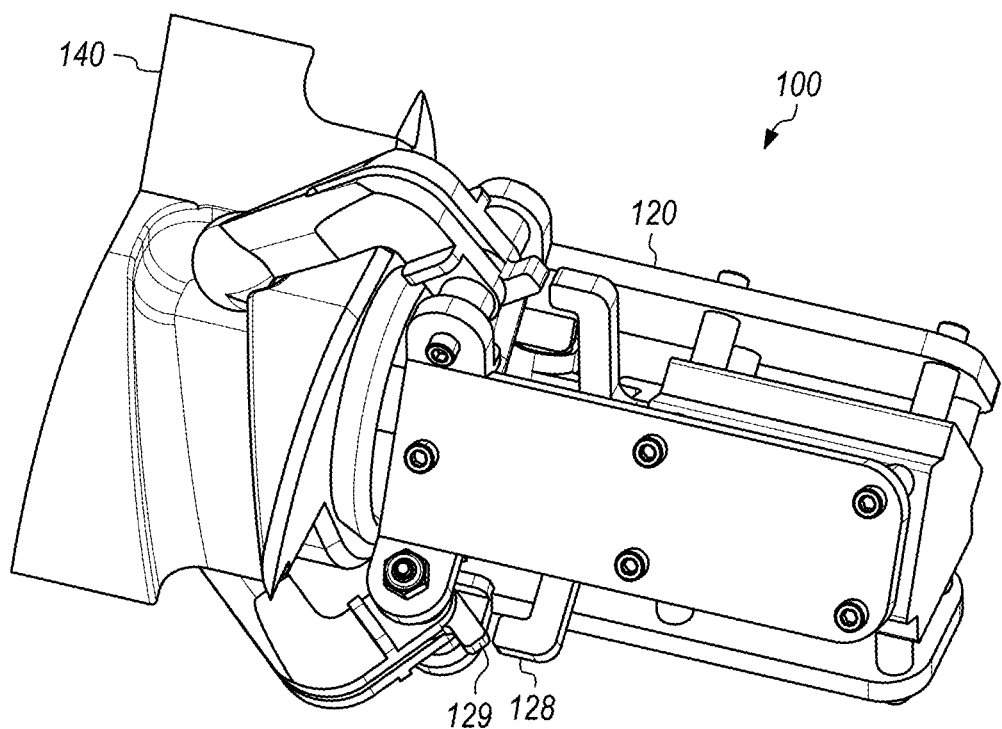

During attachment between the clamp 120 and the receptacle 140, the trigger arm 122 of the clamp 120 is initially in an extended position as shown in FIG. 1A-B before beginning a contact between the clamp 120 and the receptacle 140. Also, the trigger arm 122 restrains the catchment fingers 124 in an open configuration shown in FIG. 1A-B. After beginning the contact, the trigger arm 122 of the clamp 120 and the aligner 142 of the receptacle 140 move toward each other while aligning the axis 123 of the clamp 120 with a corresponding axis 143 of the receptacle 140. Typically, the axis 123 of the clamp 120 and the corresponding axis 143 of the receptacle 140 become fully aligned as shown in FIG. 2A-B before the trigger arm 122, in the contact with the aligner 142, transitions away from the extended position shown in FIG. 1A-B. As clamp 120 and the receptacle 140 move further toward each other, the contact between the trigger arm 122 and the aligner 142 pushes the trigger arm 122 into the clamp 120. This pushes the trigger arm 122 against its bias at the extended position and toward secured and triggered positions. Upon the trigger arm 122 reaching the triggered position, the trigger arm 122 releases or has released the catchment fingers 124 of the clamp 120 into the curved grooves 144 of the receptacle 140, and the clamp 120 and the receptacle 140 become secured to each together with the catchment fingers 124 engaging the closed interior end 145 of the curved grooves 144 as shown in FIGS. 3A-B.

Figure 4A:
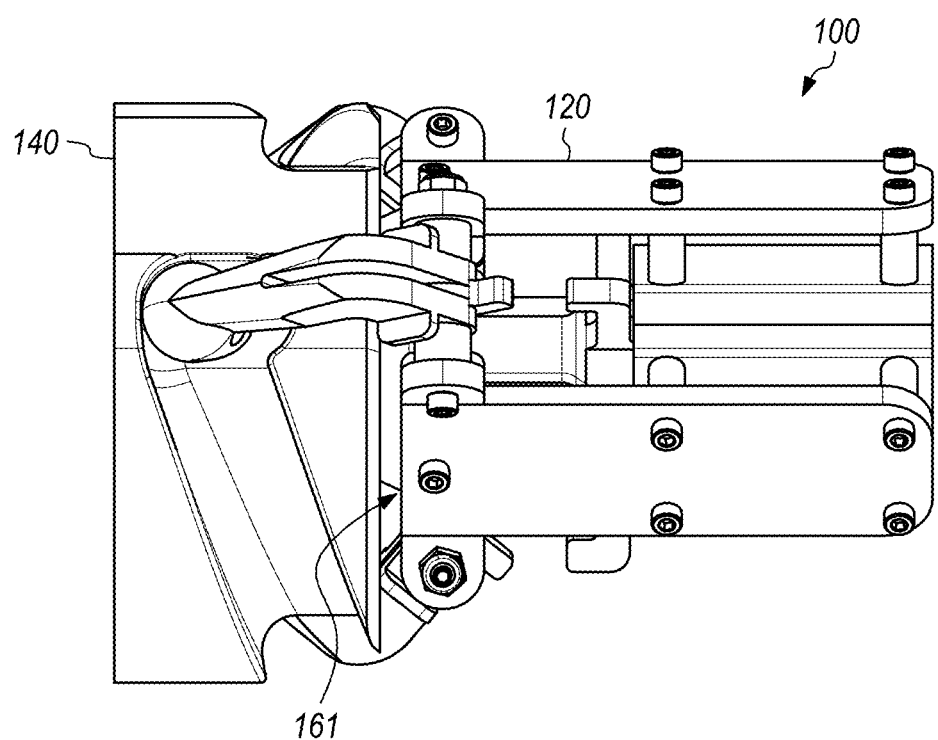
FIG. 4A is a side view and FIG. 4B is a perspective view of a prototype of a mechanical attachment mechanism at a beginning of a detachment of a clamp and a receptacle of the mechanical attachment mechanism in accordance with an embodiment of the invention.
Figure 4B:
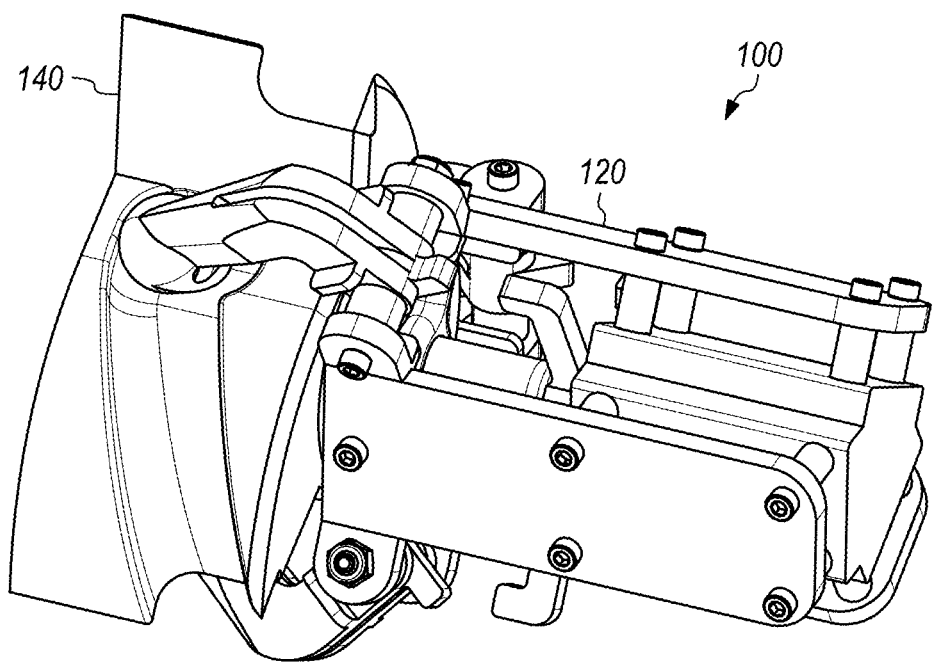
Figure 5A:
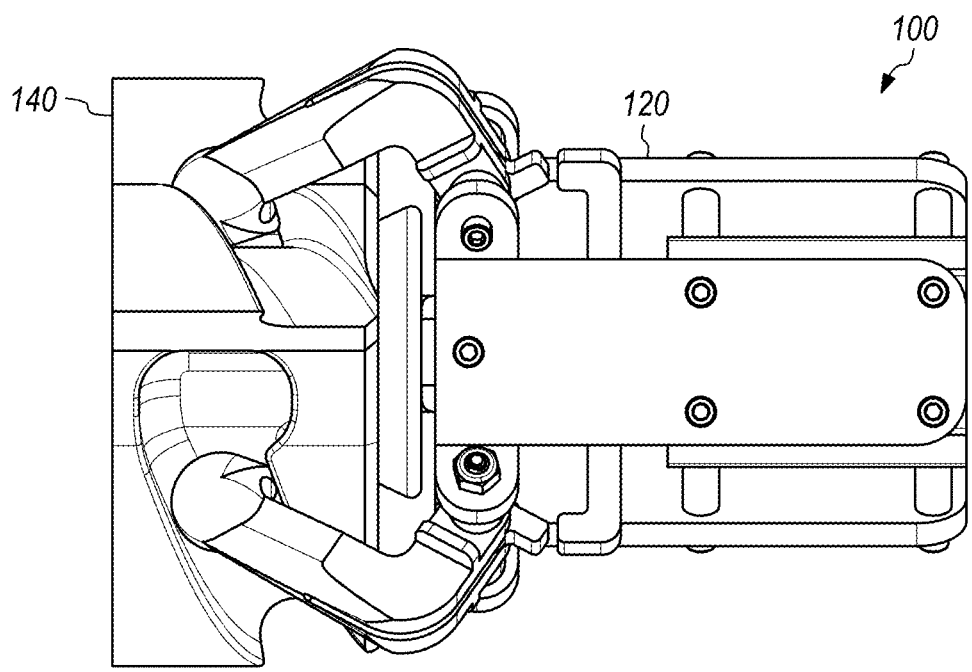
FIG. 5A is a side view and FIG. 5B is a perspective view of a prototype of a mechanical attachment mechanism partway through a detachment of a clamp and a receptacle of the mechanical attachment mechanism in accordance with an embodiment of the invention.
Figure 5B:
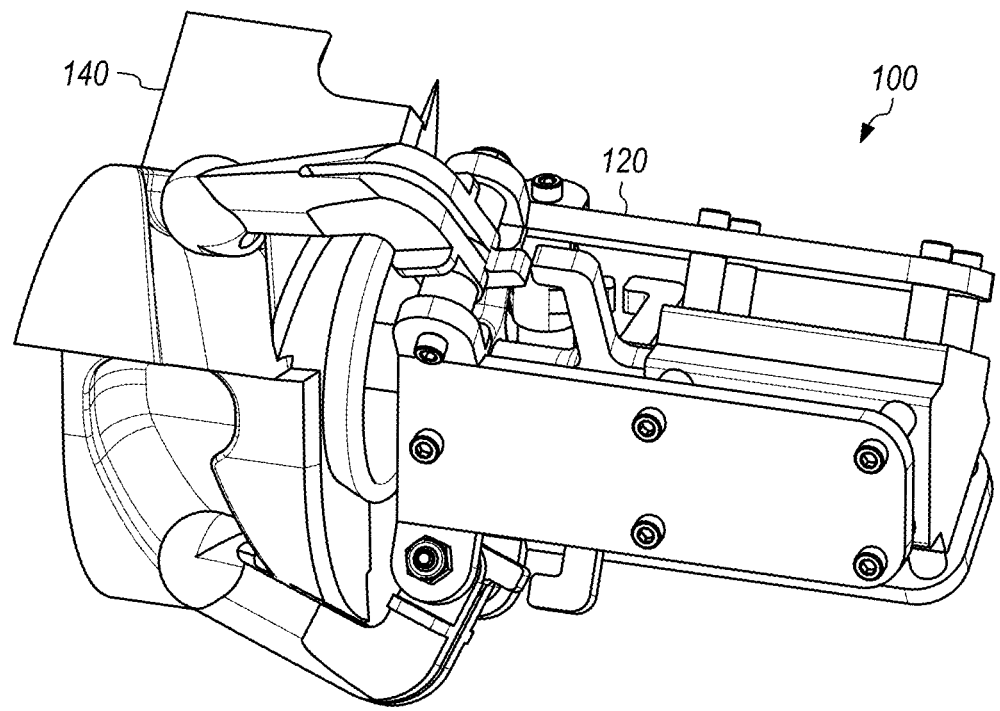
Figure 6A:
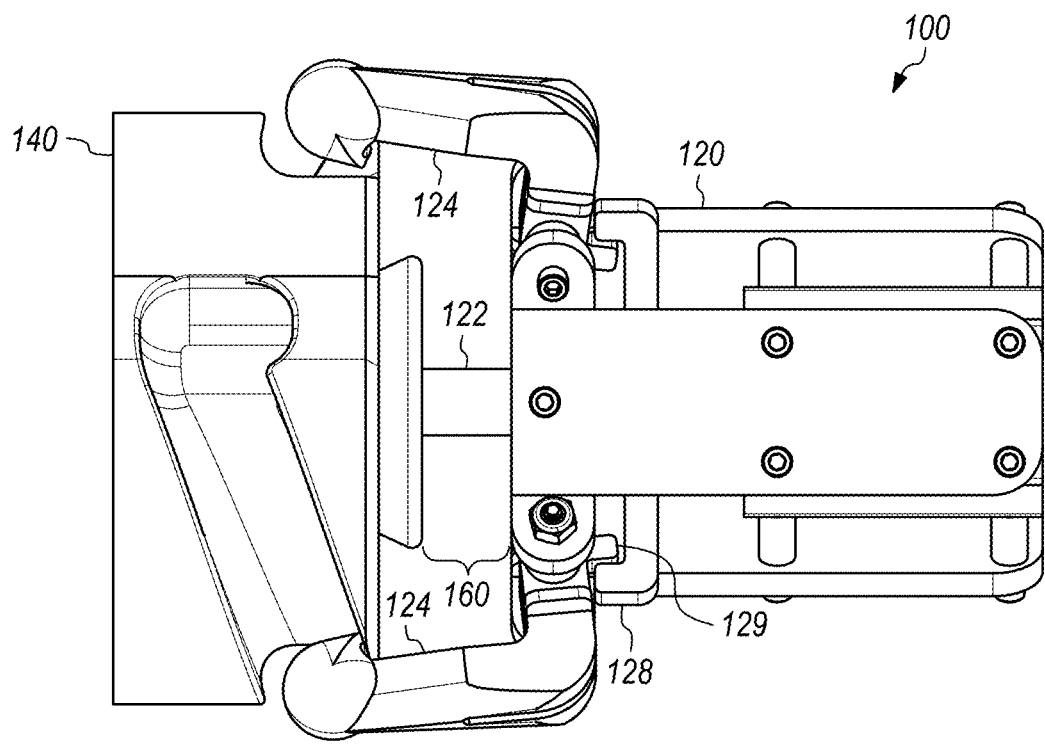
FIG. 6A is a side view and FIG. 6B is a perspective view of a prototype of a mechanical attachment mechanism at an end of contact detaching a clamp and a receptacle of the mechanical attachment mechanism in accordance with an embodiment of the invention.
Figure 6B:
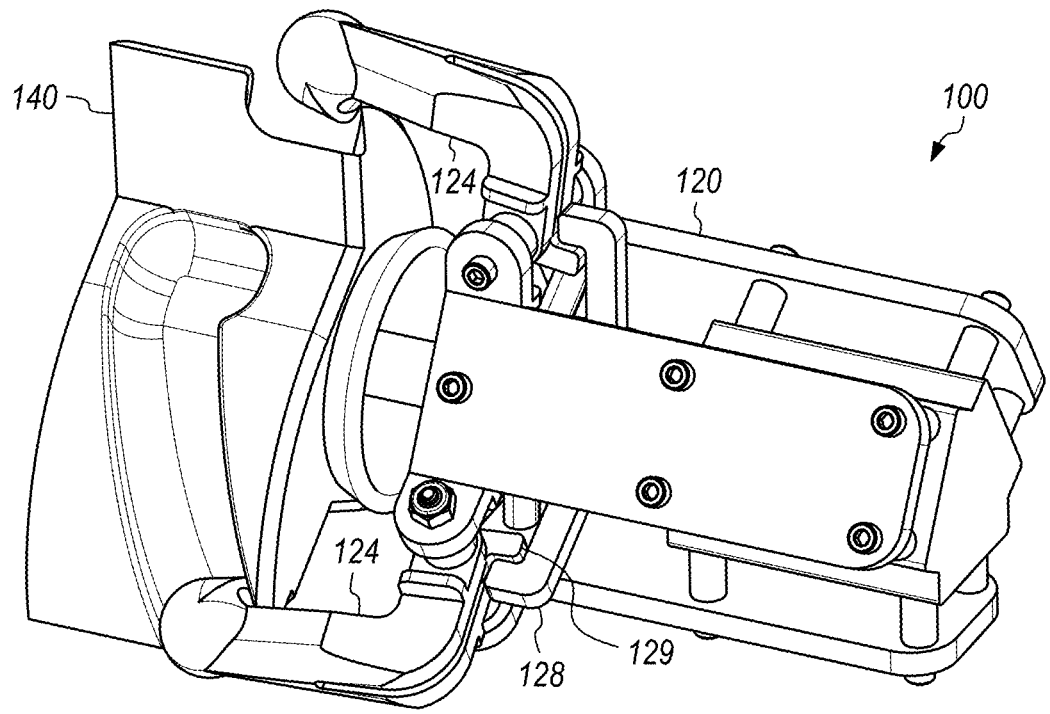

During detachment between the clamp 120 and the receptacle 140, the clamp 120 and the receptacle 140 relatively move, including rotating relative to each other around the axis 123 as shown in the sequence of FIGS. 4A-B, FIGS. 5A-B, and FIGS. 6A-B while the catchment fingers 124 engage the curved grooves 144 from the closed interior end 145 to the open exterior end 146 of the curved grooves 144. Concurrently, the trigger arm 122, still in the contact with the aligner 142, transitions back to the extended position as shown in FIG. 6A-B. Upon the trigger arm 122 reaching the extended position as shown in FIG. 6A-B, the trigger arm 122 captures the catchment fingers 124 from the open exterior end 146 of the curved grooves 144. In one embodiment, the trigger arm 122 includes a catch 128 for each of the catchment fingers 124 that engages a tab 129 on the catchment finger.

Thus, the trigger arm 122 returns to the extended position and the catchment fingers 124 return to their open configuration after ending the contact between the clamp 120 and the receptacle 140. Therefore, the mechanical attachment mechanism 100 returns to the state of FIG. 1A-B with the clamp 120 prepared for reattachment to the receptacle 140 or attachment to another similar receptacle. Specifically in one embodiment, a combined state of the trigger arm 122, the springs 126 and 127, and the catchment fingers 124 of the clamp 120 is identical before and after the contact.

An advantage is the mechanical attachment mechanism 100 includes no internal powered actuators for repeated attachment and detachment. Instead, attachment and detachment is achieved with external actuators for translating and rotating the clamp 120 and the receptacle 140 relative to each other.

Figure 7:
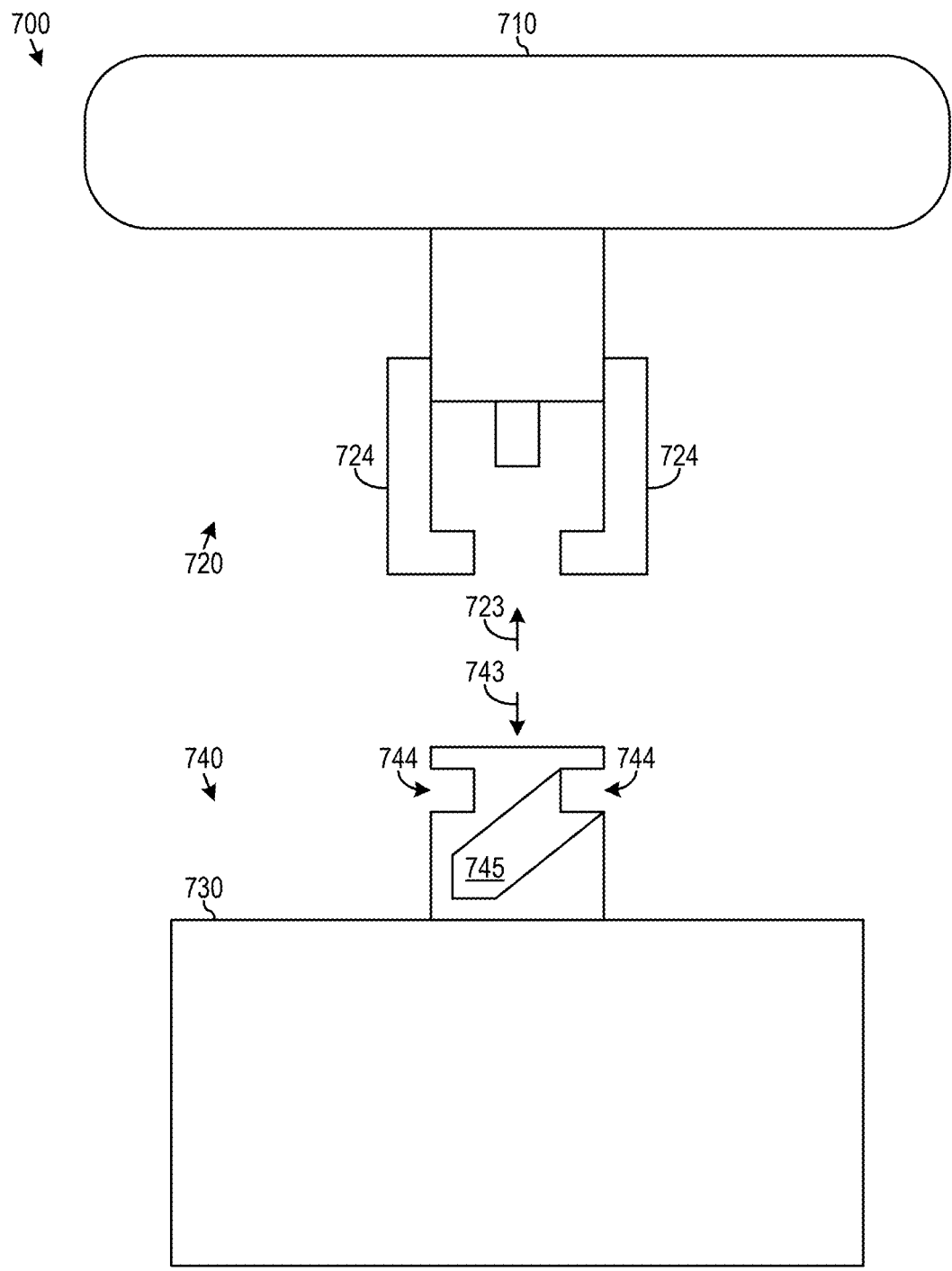
FIG. 7 is a block diagram of a mechanical attachment mechanism with a clamp further including an unmanned underwater vehicle (UUV) and a receptacle further including a cargo container in accordance with an embodiment of the invention.

For example, FIG. 7 is a block diagram of a mechanical attachment mechanism 700 with the clamp 720 further including an unmanned underwater vehicle (UUV) 710 and the receptacle 740 further including a cargo container 730 in accordance with an embodiment of the invention. The clamp 720 clamps at the bottom of the UUV 710, and the receptacle 740 receives the clamp 720 at the top of a cargo container 730. To pick up the cargo container 730 resting on the seafloor, the UUV 710 maneuvers to bring vertical axis 723 of the clamp 720 into rough alignment with the corresponding axis 743 of the receptacle 740 and to bring the catchment fingers 724 into rough rotational alignment with the closed interior end 745 of the curved grooves 744 as shown in FIG. 7. Upon the unmanned underwater vehicle descending, the catchment fingers 724 quickly snap into the closed interior end 745 of the curved grooves 744. The UUV 710 can then lift, transport, and release the cargo container 730 at a different location. Thus, the clamp 720 and the receptacle 740 are solely powered during a sequence of attachments and detachments with the mechanical power of the UUV 710 providing relative translational and rotational movements between the clamp 720 and the receptacle 740.

Referring back to FIG. 1A-B through FIG. 6A-B, the curved grooves 144 of the receptacle 140 each have a compound curvature that enables relative rotation between the clamp 120 and the receptacle 140 to spread apart the catchment fingers 124 during detachment, so that the catchment fingers 124 return to their initial open configuration restrained by the trigger arm 122. The curved grooves 144 each have the compound curvature including a spiral component and a helical component around a corresponding axis 143 of the receptacle 140. The spiral component ramps away from the corresponding axis 143 between the closed interior end 145 and the open exterior end 146 of the curved grooves 144. The helical component slopes along the corresponding axis 143 between closed interior end 145 and the open exterior end 146 of the curved grooves 144. The spiral component has a gradual ramp, and this limits the rotational force needed for the relative rotation between the clamp 120 and the receptacle 140.

As the relative rotation progresses from the triggered position of FIG. 4A-B through the position of FIG. 5A-B to the extended position of FIG. 6A-B, the helical component separates the clamp 120 and the receptacle 140 while the trigger arm 122, in continuing contact with the aligner 142, correspondingly transitions from the triggered position of FIG. 4A-B to the extended position of FIG. 6A-B. In addition, as relative rotation progresses from the triggered position of FIG. 4A-B to the extended position of FIG. 6A-B, the spiral component hyperextends the catchment fingers 124 away from the trigger arm 122 as shown in FIG. 6A-B. Upon ending contact between the clamp 120 and the receptacle 140, the trigger arm 122 captures the hyperextended catchment fingers 124 from the open exterior end 146 of the curved grooves 144, and the hyperextended catchment fingers 124 settle back into the open configuration of FIG. 1A-B. The hyperextended catchment fingers 124 prevent any friction between the catch 128 and the tab 129 before the catch 128 of the trigger arm 122 captures the tab 129 of the hyperextended catchment fingers 124.

Generally, the trigger arm 122 of the clamp 120 has extended, triggered, and secured positions. The extended position is for the trigger arm 122 beginning (FIGS. 2A-B) and ending (FIGS. 6A-B) contact between the trigger arm 122 and the aligner 142 of the receptacle 140. The extended position is also for the trigger arm 122 capturing the catchment fingers 124 of the clamp 120 from the open exterior end 146 of the curved grooves 144 of the receptacle 140. The triggered position is for the trigger arm 122 releasing the catchment fingers 124 into the curved grooves 144. The secured position is for securing the clamp 120 and the receptacle 140 together with the catchment fingers 124 engaging the closed interior end 145 of the curved grooves 144 as shown in FIGS. 3A-B.

In one embodiment, the optional recess 155 at the closed interior end 145 of the curved grooves 144 is omitted, such that the secured and triggered positions are the same position. In this embodiment, when the clamp 120 and the receptacle 140 are secured together with the catchment fingers 124 engaging the closed interior end 145 of the curved grooves 144 of the receptacle 140, the clamp 120 and the receptacle 140 are secured from all relative translational and rotational movements between the clamp 120 and the receptacle 140 except for, as viewed from the clamp 120, counterclockwise rotational movement of the clamp 120 around the axis 123 relative to the receptacle 140. It will be appreciated that this one degree of freedom of relative movement is instead clockwise rotational movement when the curved grooves 144 have reversed threading.

In one embodiment, the trigger arm 122 of the clamp 120 includes an alignment cone 132 projecting along the axis 123. The aligner 142 of the receptacle 140 includes a complementary alignment cone 152 for aligning the axis 123 of the projecting alignment cone 132 of the clamp 120 with a corresponding axis 143 of the complementary alignment cone 152 of the receptacle 140. In an embodiment with the spring 126 biasing the trigger arm 122, the spring biases the trigger arm 122 at the extended position so that the typical forces encountered during alignment are not sufficient to displace the trigger arm 122 away from the extended position, so that the trigger arm 122, in the contact with the aligner 142, remains at the extended position during alignment; however, during energetic alignment the trigger arm 122 can recede to a position between the extended position and the triggered position. The projecting alignment cone 132 can include bearings providing free rotations of the projecting alignment cone 132 about axis 123, and this facilitates relative rotation between the clamp 120 and the receptacle 140 during detachment when the trigger arm 122 is in frictional contact with the aligner 142.

In one embodiment, the catchment fingers 124 of the clamp 120 each have a claw tip 134, and the curved grooves 144 of the receptacle 140 each have a complementary recess 155 that opens inward at the closed interior end 145 of the curved grooves 144. Then the secured position of the trigger arm 122 is between the extended position and the triggered position of the trigger arm 122. When the trigger arm 122 is in contact with the aligner 142, the extended position of the trigger arm 122 corresponds to a large gap 160 between the clamp 120 and the receptacle 140 as shown in FIG. 2A and FIG. 6A. Similarly, the triggered position of the trigger arm 122 corresponds to no gap 161 between the clamp 120 and the receptacle 140 as shown in FIG. 4A, and the secured position of the trigger arm 122 corresponds to a small gap 162 between the clamp 120 and the receptacle 140 as shown in FIG. 3A.

The triggered position is for releasing the catchment fingers 124 of the clamp 120 into the curved grooves 144 of the receptacle 140 with the claw tip 134 of each of the catchment fingers 124 nearby the complementary recess 155 of the closed interior end 145 of a respective one of the curved grooves 144. The secured position is for the securing of the clamp 120 and the receptacle 140 together with the claw tip 134 of the catchment fingers 124 engaging the complementary recess 155 of the closed interior end 145 of the curved grooves 144 as shown in FIG. 3A-B.

The claw tip 134 and complementary recess 155 increase a tolerance for misalignment between the clamp 120 and the receptacle 140 during attachment, while still provide quick snap action attachment into the secured position shown in FIG. 3A-B. For example, the tolerance includes that the catchment fingers 124 can be rotationally misaligned from the complementary recess 155 by up to about half the width of the claw tip 134. The claw tip 134 with complementary recess 155 also increases a tolerance for the exact release position where the trigger arm 122 releases the catchment fingers 124, with this release position being anywhere between the secured position and the already triggered position. Thus, upon the claw tip 134 of each of the catchment fingers 124 of the clamp 120 engaging the complementary recess 155 of the closed interior end 145 of the curved grooves 144 of the receptacle 140 during the securing of the clamp 120 and the receptacle 140 together, any residual misalignment between the clamp 120 and the receptacle 140 becomes eliminated.

In an embodiment with the springs 126 and 127, the quick snap action attachment utilizes the spring 127 for each of the catchment fingers 124 to quickly snap the catchment fingers 124 into the curved grooves 144 of the receptacle 140. The quick snap action attachment also utilizes the spring 126 to push the clamp 120 and the receptacle 140 away from each other from the triggered position to the secured position using the force of the trigger arm 122 pressing against the aligner 142, and this quickly snaps the claw tip 134 of each of the catchment fingers 124 of the clamp 120 into the complementary recess 155 of the closed interior end 145 of the curved grooves 144 of the receptacle 140.

Upon the claw tip 134 of the catchment fingers 124 of the clamp 120 engaging the complementary recess 155 of the closed interior end 145 of the curved grooves 144 of the receptacle 140 during securing of the clamp 120 and the receptacle 140 together, the clamp 120 and the receptacle 140 are secured from all relative translational and rotational movements between the clamp 120 and the receptacle 140 except translating the clamp 120 and the receptacle 140 toward each other along the axis 123. Thus, to detach the clamp 120 and the receptacle 140, the clamp 120 and the receptacle 140 must first move toward each other along the axis 123 until the positioning of FIG. 4A-B is achieved. Next, as viewed from the clamp 120, the clamp 120 must undergo counterclockwise rotational movement around the axis 123 relative to the receptacle 140 until the positioning of FIG. 6A-B is achieved. Detachment completes when the clamp 120 and the receptacle 140 subsequently move away from each other and end their contact.

Thus, in the embodiment of FIG. 7, the weight of the cargo container 730 generally keeps the clamp 720 and the receptacle 740 securely attached for all translational and rotational movements. Detachment requires first relieving the weight of the cargo container 730 upon setting the cargo container 730 upon the seafloor, followed by translational movement from the UUV 710 descending further, and subsequently the UUV 710 rotating counterclockwise as viewed from above the UUV 710.

Figure 8:
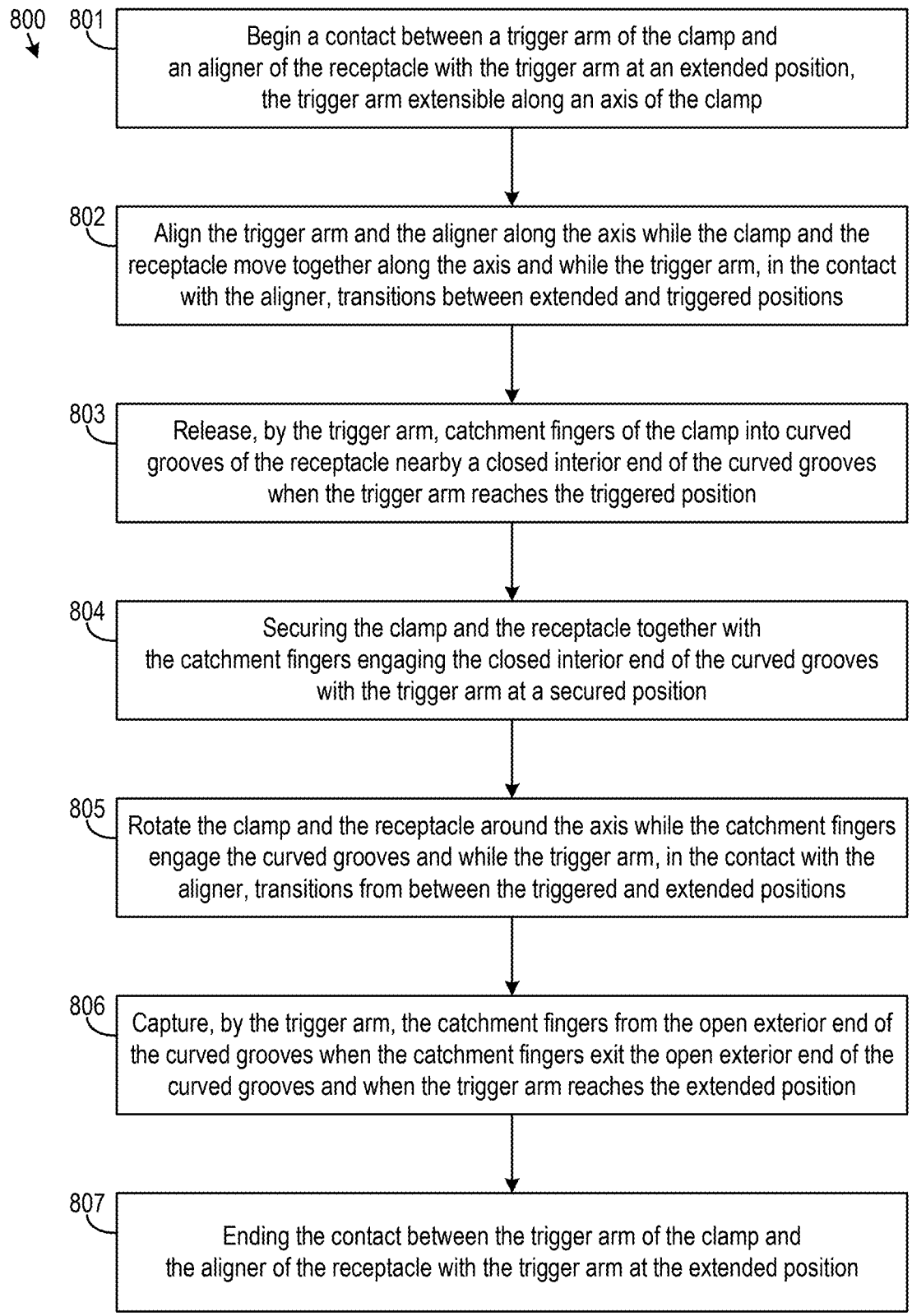
FIG. 8 is a flow diagram of a process for attachment and detachment using a mechanical attachment mechanism including a clamp and a receptacle in accordance with an embodiment of the invention.

FIG. 8 is a flow diagram of a process 800 for attachment and detachment using a mechanical attachment mechanism including a clamp and a receptacle in accordance with an embodiment of the invention.

Attachment includes steps 801, 802, 803, and 804. At step 801, a contact begins between a trigger arm of the clamp and an aligner of the receptacle with the trigger arm at an extended position, the trigger arm extensible along an axis of the clamp. At step 802, the trigger arm and the aligner are aligned along the axis while the clamp and the receptacle move toward each other along the axis and while the trigger arm, in the contact with the aligner, correspondingly transitions from the extended position to a triggered position. At step 803, the trigger arm releases catchment fingers of the clamp into curved grooves of the receptacle nearby a closed interior end of the curved grooves when the trigger arm reaches the triggered position. At step 804, the clamp and the receptacle are secured together with the catchment fingers engaging the closed interior end of the curved grooves with the trigger arm at a secured position.

Detachment includes steps 805, 806, and 807. At step 805, the clamp and the receptacle rotate relative to each other around the axis while the catchment fingers engage the curved grooves from the closed interior end to an open exterior end of the curved grooves and while the trigger arm, in the contact with the aligner, correspondingly transitions from the triggered position to the extended position. At step 806, the trigger arm captures the catchment fingers from the open exterior end of the curved grooves when the catchment fingers exit the open exterior end of the curved grooves and when the trigger arm reaches the extended position. At step 807, the contact ends between the trigger arm of the clamp and the aligner of the receptacle with the trigger arm returned to the extended position.

In one embodiment, the securing of step 804 includes translating the clamp and the receptacle away from each other along the axis while the trigger arm, in the contact with the aligner, correspondingly transitions from the triggered position to the secured position, which is between the extended position and the triggered position of the trigger arm. Then claw tips of the catchment fingers of the clamp anchor in complementary recesses at the closed interior end of the curved grooves of the receptacle. In addition, the detachment following the securing of step 804 includes, at step 805 and before the rotating within step 805, translating the clamp and the receptacle toward each other along the axis while the trigger arm, in the contact with the aligner, correspondingly transitions from the secured position to the triggered position.

A combined state of the trigger arm and the catchment fingers of the clamp is identical before the beginning of the contact at step 801 and after the ending of the contact at step 807, such that, after the ending of the contact of process 800, the clamp is prepared for attachment and detachment with the receptacle again upon repeating the steps 801 through 807, or for attachment and detachment with another similar receptacle.

From the above description of Mechanical Attachment Mechanism with Catchment Fingers Engaging Curved Grooves, it is manifest that various techniques may be used for implementing the concepts of mechanisms 100 and 700 and the method 800 without departing from the scope of the claims. The described embodiments are to be considered in all respects as illustrative and not restrictive. The mechanisms/methods disclosed herein may be practiced in the absence of any element that is not specifically claimed and/or disclosed herein. It should also be understood that each of the mechanisms 100 or 700 or the method 800 is not limited to the particular embodiments described herein, but is capable of many embodiments without departing from the scope of the claims.

I claim:

1. A mechanical attachment mechanism, comprising:
a clamp including a trigger arm extensible along an axis and a plurality of catchment fingers arranged around the axis and biased to pivot toward the trigger arm; and
a receptacle including an aligner and a plurality of curved grooves, which each have a closed interior end and an open exterior end,
wherein attachment between the clamp and the receptacle includes:
the trigger arm of the clamp starts in an extended position before beginning a contact between the clamp and the receptacle,
after beginning the contact, the trigger arm and the aligner of the receptacle move toward each other while aligning the axis of the clamp with a corresponding axis of the receptacle and while the trigger arm, in the contact with the aligner, transitions from the extended position to a triggered position, and
upon the trigger arm reaching the triggered position, the trigger arm releases the catchment fingers of the clamp into the curved grooves of the receptacle, and the clamp and the receptacle become secured to each together with the catchment fingers engaging the closed interior end of the curved grooves, and,
wherein detachment between the clamp and the receptacle includes:
as the clamp and the receptacle relatively move, including rotating relative to each other around the axis while the catchment fingers engage the curved grooves from the closed interior end to the open exterior end of the curved grooves, the trigger arm, in the contact with the aligner, transitions to the extended position,
upon the trigger arm reaching the extended position, the trigger arm captures the catchment fingers from the open exterior end of the curved grooves, and
the trigger arm returns to the extended position after ending the contact between the clamp and the receptacle.

2. A mechanical attachment mechanism, comprising:
a clamp including a trigger arm extensible along an axis and a plurality of catchment fingers arranged around the axis and biased to pivot toward the trigger arm; and
a receptacle including an aligner and a plurality of curved grooves, which each have an open exterior end and a closed interior end,
wherein:
the trigger arm of the clamp includes a spring that biases the trigger arm along the axis from a triggered position toward a secured position and an extended position,
the extended position is for the trigger arm beginning and ending contact between the trigger arm and the aligner of the receptacle, the extended position is also for the trigger arm capturing the catchment fingers of the clamp from the open exterior end of the curved grooves of the receptacle,
the triggered position is for the trigger arm releasing the catchment fingers into the curved grooves, and
the secured position is for securing the clamp and the receptacle together with the catchment fingers engaging the closed interior end of the curved grooves.

3. The mechanical attachment mechanism of claim 2, wherein the clamp and the receptacle are solely powered during a sequence of attachments and detachments with a mechanical power of relative translational and rotational movements between the clamp and the receptacle.

4. The mechanical attachment mechanism of claim 2, wherein the curved grooves of the receptacle each have a compound curvature including a spiral component and a helical component.

5. The mechanical attachment mechanism of claim 4, wherein:
the spiral component ramps away from a corresponding axis between the closed interior end and the open exterior end of the curved grooves; and
the helical component slopes along the corresponding axis between the closed interior end and the open exterior end of the curved grooves.

6. The mechanical attachment mechanism of claim 5, wherein:
the spiral component ramps away from the corresponding axis for hyperextending the catchment fingers away from the trigger arm; and
the helical component slopes along the corresponding axis for separating the clamp and the receptacle while the trigger arm, in the contact with the aligner, correspondingly transitions from the triggered position to the extended position.

7. The mechanical attachment mechanism of claim 2, wherein:
the trigger arm of the clamp includes an alignment cone projecting along the axis; and
the aligner of the receptacle includes a complementary alignment cone for aligning the axis of the projecting alignment cone of the clamp with a corresponding axis of the complementary alignment cone of the receptacle while the trigger arm, in the contact with the aligner, is at the extended position or between the extended position and the triggered position.

8. The mechanical attachment mechanism of claim 2, wherein:
the plurality of catchment fingers of the clamp is three identical catchment fingers arranged evenly spaced around the axis; and
the plurality of curved grooves of the receptacle is three identical curved grooves arranged evenly spaced around the receptacle.

9. The mechanical attachment mechanism of claim 2, wherein the secured position is the triggered position and, during the securing of the clamp and the receptacle together with the catchment fingers engaging the closed interior end of the curved grooves of the receptacle, the clamp and the receptacle are secured from all relative translational and rotational movements between the clamp and the receptacle except a particular one of clockwise or counterclockwise rotational movement of the clamp around the axis relative to the receptacle.

10. The mechanical attachment mechanism of claim 2, wherein:
the catchment fingers of the clamp each have a claw tip; and the curved grooves of the receptacle each have a complementary recess opening inward at the closed interior end of the curved grooves.

11. The mechanical attachment mechanism of claim 10, wherein:
the secured position of the trigger arm is between the extended position and the triggered position of the trigger arm;
the triggered position is for the releasing of the catchment fingers of the clamp into the curved grooves of the receptacle with the claw tip of each of the catchment fingers nearby the complementary recess of the closed interior end of a respective one of the curved grooves; and
the secured position is for the securing of the clamp and the receptacle together with the claw tip of the catchment fingers engaging the complementary recess of the closed interior end of the curved grooves.

12. The mechanical attachment mechanism of claim 11, wherein, upon the claw tip of the catchment fingers of the clamp engaging the complementary recess of the closed interior end of the curved grooves of the receptacle during the securing of the clamp and the receptacle together, any residual misalignment between the clamp and the receptacle becomes eliminated.

13. The mechanical attachment mechanism of claim 12, wherein, upon the claw tip of the catchment fingers of the clamp engaging the complementary recess of the closed interior end of the curved grooves of the receptacle during the securing of the clamp and the receptacle together, the clamp and the receptacle are secured from all relative translational and rotational movements between the clamp and the receptacle except translating the clamp and the receptacle toward each other along the axis.

14. The mechanical attachment mechanism of claim 2, wherein the clamp further includes an unmanned underwater vehicle (UUV) and the receptacle further includes a cargo container, which is lifted, transported, and released by the UUV using the mechanical attachment mechanism.

15. A method for attachment and detachment using the mechanical attachment mechanism of claim 2, the method comprising the following steps:
the beginning of the contact between the trigger arm of the clamp and the aligner of the receptacle with the trigger arm at the extended position;
aligning the trigger arm and the aligner along the axis while the clamp and the receptacle move toward each other along the axis and while the trigger arm, in the contact with the aligner, correspondingly transitions from the extended position to the triggered position;
the releasing, by the trigger arm, of the catchment fingers of the clamp into the curved grooves of the receptacle nearby the closed interior end of the curved grooves when the trigger arm reaches the triggered position;
the securing of the clamp and the receptacle together with the catchment fingers engaging the closed interior end of the curved grooves with the trigger arm at the secured position;
rotating the clamp and the receptacle relative to each other around the axis while the catchment fingers engage the curved grooves from the closed interior end to the open exterior end of the curved grooves and while the trigger arm, in the contact with the aligner, correspondingly transitions from the triggered position to the extended position;
the capturing, by the trigger arm, of the catchment fingers from the open exterior end of the curved grooves when the catchment fingers exit the open exterior end of the curved grooves and when the trigger arm reaches the extended position; and
the ending of the contact between the trigger arm of the clamp and the aligner of the receptacle with the trigger arm at the extended position.

16. The method of claim 15, wherein:
the securing includes:
translating the clamp and the receptacle away from each other along the axis while the trigger arm, in the contact with the aligner, correspondingly transitions from the triggered position to the secured position, which is between the extended position and the triggered position of the trigger arm; and
anchoring a plurality of claw tips of respective ones of the catchment fingers of the clamp in a plurality of complementary recesses at the closed interior end of the curved grooves of the receptacle; and
the steps of the method further comprising, after the securing and before the rotating, translating the clamp and the receptacle toward each other along the axis while the trigger arm, in the contact with the aligner, correspondingly transitions from the secured position to the triggered position.

17. The method of claim 15, wherein a combined state of the trigger arm, the spring, and the catchment fingers of the clamp is identical before the beginning of the contact and after the ending of the contact, such that, after the ending of the contact, the clamp is prepared for attachment and detachment with the receptacle again upon repeating the steps or for attachment and detachment with another similar receptacle.

18. A method for attachment and detachment using a mechanical attachment mechanism including a clamp and a receptacle, the method comprising the following steps:
beginning a contact between a trigger arm of the clamp and an aligner of the receptacle with the trigger arm at an extended position, the trigger arm extensible along an axis of the clamp;
aligning the trigger arm and the aligner along the axis while the clamp and the receptacle move toward each other along the axis and while the trigger arm, in the contact with the aligner, correspondingly transitions from the extended position to a triggered position;
releasing, by the trigger arm, a plurality of catchment fingers of the clamp into a plurality of curved grooves of the receptacle nearby a closed interior end of the curved grooves when the trigger arm reaches the triggered position;
securing the clamp and the receptacle together with the catchment fingers engaging the closed interior end of the curved grooves with the trigger arm at a secured position;
rotating the clamp and the receptacle relative to each other around the axis while the catchment fingers engage the curved grooves from the closed interior end to an open exterior end of the curved grooves and while the trigger arm, in the contact with the aligner, correspondingly transitions from the triggered position to the extended position;
capturing, by the trigger arm, the catchment fingers from the open exterior end of the curved grooves when the catchment fingers exit the open exterior end of the curved grooves and when the trigger arm reaches the extended position; and ending the contact between the trigger arm of the clamp and the aligner of the receptacle with the trigger arm at the extended position.

19. The method of claim 18, wherein:
the securing includes:
  translating the clamp and the receptacle away from each other along the axis while the trigger arm, in the contact with the aligner, correspondingly transitions from the triggered position to the secured position, which is between the extended position and the triggered position of the trigger arm; and
  anchoring a plurality of claw tips of respective ones of the catchment fingers of the clamp in a plurality of complementary recesses at the closed interior end of the curved grooves of the receptacle; and
the steps of the method further comprising, after the securing and before the rotating, translating the clamp and the receptacle toward each other along the axis while the trigger arm, in the contact with the aligner, correspondingly transitions from the secured position to the triggered position.

20. The method of claim 18, wherein a combined state of the trigger arm and the catchment fingers of the clamp is identical before the beginning of the contact and after the ending of the contact, such that, after the ending of the contact, the clamp is prepared for attachment and detachment with the receptacle again upon repeating the steps or for attachment and detachment with another similar receptacle.

* * * * *